No. 786,048. PATENTED MAR. 28, 1905.
J. B. NAU.
PROCESS OF PURIFYING PIG METALS.
APPLICATION FILED APR. 27, 1903.
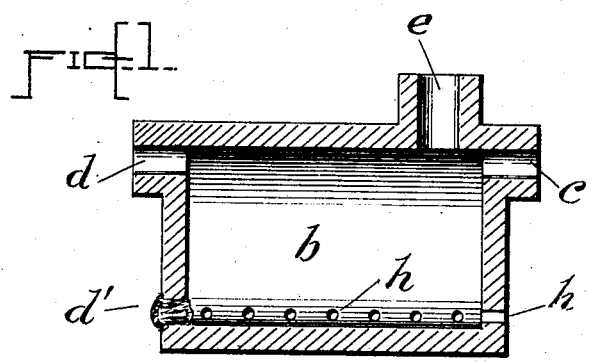
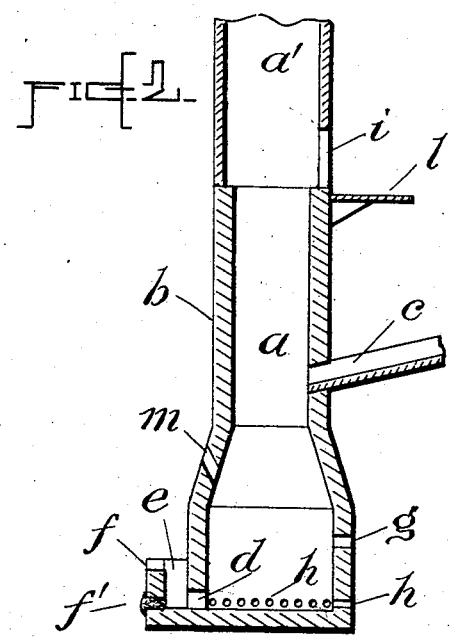

No. 786,048. Patented March 28, 1905.

UNITED STATES PATENT OFFICE.

JOHN B. NAU, OF NEW YORK, N. Y.

PROCESS OF PURIFYING PIG METALS.

SPECIFICATION forming part of Letters Patent No. 786,048, dated March 28, 1905.

Application filed April 27, 1903. Serial No. 154,455.

*To all whom it may concern:*

Be it known that I, JOHN B. NAU, a citizen of the United States, residing in the borough of Manhattan, city of New York, county of New York, State of New York, have invented an Improved Process of Refining Pig-Iron and other Pig Metals, of which the following is a specification.

This invention relates to a special method of obtaining and maintaining for the period desired intimate contact between liquid metals—for instance, pig-iron—and solid metallic or mineral oxids—for instance, iron ore—whereby the liquid metal is refined and enriched through the reactions generally understood by those skilled in this art. Thus, for instance, if liquid pig-iron be treated in this way by iron ore under the right conditions of temperature the elements silicon, phosphorus, manganese, carbon, and sulfur contained in the iron will each be eliminated by oxidation to a certain extent from the pig-iron, while the iron will be enriched by the iron reduced from the ore during the reactions; but if liquid pig-iron be treated in the same manner by, for instance, chrome ore or tungsten ore or any other ore that under the right conditions of temperature can be reduced by either one of the elements silicon, phosphorus, &c., contained in the pig-iron a similar refining of pig-iron will take place, and in this case the so-refined iron will also be enriched by the incorporation of the metallic chromium or tungsten, &c., reduced from the ore. In order that the reactions between the liquid metal to be purified and the solid oxidizing agents or oxids may take place rapidly, it is necessary that the oxids be prevented from merely floating on the surface of the liquid-metal bath, which, owing to their greater lightness than the metal, they would naturally do, and they must be brought by some outside means to come in intimate contact with and be kept immersed, at least to a large extent, in the liquid metal to be purified. It is also desirable for a quicker action that these oxidizing agents be brought to such a temperature as will be most beneficial to the subsequent reactions taking place between them and the liquid metal to be purified.

In the accompanying drawings, which illustrate apparatus by which the new method forming the subject of this application may be practiced, Figure 1 is a vertical section through a drum-shaped vessel adapted to be wholly or partly filled with pieces of solid oxidizing material, and Fig. 2 is a similar view of an upright vessel in the form of a stack.

The vessel shown in Fig. 1 has an inlet $c$, through which liquid pig-iron can be introduced, and an outlet $d$, through which purified metal can be discharged. There is also an opening $e$ in the top for the escape of gases, but which may be used for introduction of the liquid pig-iron, in which case the opening $c$ may be omitted. A normally closed auxiliary tap-hole $d'$ is shown near the bottom. The vessel is filled or partly filled with broken pieces of metallic or mineral oxid, and when the liquid metal is introduced through $c$ or $e$ it will percolate through the confined mass of oxid, descending to the bottom of the vessel and forming a liquid-bath whose level will gradually rise through the oxid kept immersed by confinement until the metal flows off at $d$. Contact between the liquid metal and oxidizing material will thus be most intimate and may be prolonged to obtain the desired result. Openings $h$ for the introduction of a heating medium to raise the ore or oxid to the desired temperature may be located in any appropriate part of the vessel. They may be closed during the purifying operation.

The vessel shown in Fig. 2 is in the shape of a shaft or cupola $a$, with refractory lining $b$, an inlet $c$ for liquid metal, an outlet $d$ at or near the bottom, a forehearth or outside riser $e$, with an overflow $f$, where the purified metal will flow out when the level of the bath, accumulating on the bottom, reaches the same elevation. This arrangement prevents any pieces of oxidizing material from interfering with free evacuation of the purified metal. A normally closed auxiliary tap-hole $f'$ may be provided at or near the bottom of the riser. Somewhat above the overflow $f$ is an opening $g$ for evacuation of slag formed during the operation. $h$ indicates openings for heating purposes, plugged during the purifying operation. A charging-floor $l$ is provided near the top of the purifying vessel. The vessel may be provided with an upper extension $a'$, forming a stack with a charging-opening $i$ in the side. Openings $m$ may be provided in the side wall at any convenient level for the escape of gases. The style of vessel illustrated by Fig. 2 affords a means of making the purifying operation continuous. Liquid pig-iron entering at $c$ descends through the body of broken ore or metallic oxid and accumulates on the bottom until it overflows at $f$, while the slag formed flows out through $g$. The weight of the column of oxid maintains the base thereof immersed in the metal bath. As the ore in the lower part is consumed in the purifying operation new supplies of ore can be added at the top and in their descent become gradually raised in temperature by the heat rising from the lower zone of the vessel. The location of the inlet $c$ below the top makes such heating easy and practical, contributing materially to the success of the continuity of the process. The amount of immersion can be varied by changing the level at which overflow $f$ is located. The outside riser $e$, with its overflow $f$, may be left out entirely and the purified metal evacuated directly through opening $d$, which in that case, in order to create immersion of the base of the column of ore in the liquid-bath of iron, may be placed a convenient distance above the bottom.

Figs. 1 and 2 illustrate two means by which practical immersion and prolonged contact of the ore in the liquid-bath may be obtained. Fig. 2 further shows how continuity of the process can be obtained. These two styles are meant to illustrate how the features of the proposed method can be carried out in practice. Other means can be employed for the same purpose, provided the desired results are obtained. Furthermore, the purifying apparatus may be placed in the most convenient location. It may be placed near the blast-furnace or the direct source of supply of the liquid pig-iron, and the pig-iron may be run directly from the blast-furnace into the apparatus or it may be brought to it in a ladle or by any other means. The apparatus may be stationary. It may be placed on a car or track and run into any place where required. It may be placed near the open-hearth furnace. It may be made an accessory or integral part of the open-hearth furnace. It may be heated before the operation when it is empty or heated when filled with ore, or the ore may be heated previously and when hot poured into the purifying vessel. The heating of either vessel or ore can be done with blast-furnace gas or any other gas in connection with hot or cold air, or it can be heated with hot air alone or by means of any heat-giving agency. The iron purified in it may be disposed of in any convenient manner. It may be poured into a ladle or directly into molds or it may be run directly from the purifying apparatus into the open-hearth furnace or any other furnace where purified metal is required.

I claim as my invention—

1. A process of purifying and enriching metals, which consists in pouring liquid metal upon a mass of broken pieces of solid oxidizing material in such manner that the liquid metal will be broken up and descend in small streams through the spaces between and in contact with the pieces of oxidizing material, causing a bath of the liquid metal to accumulate, maintaining immersion of the oxidizing material in the bath, so that the bath fills the spaces in the immersed mass of oxidizing material, for the period desired, and then separating the liquid purified metal from the oxidizing material, substantially as and for the purpose set forth.

2. A process of purifying pig-iron, which consists in pouring liquid pig-iron upon a mass of broken pieces of solid metallic ore in such manner that the liquid pig-iron will be broken up and descend in small streams through the spaces between and in contact with the pieces of ore, causing a bath of the poured liquid pig-iron to accumulate, maintaining immersion of the metallic ore in the bath, so that the bath fills the spaces in the immersed mass of ore, for the period desired, and then separating the liquid-purified iron from the metallic ore, substantially as and for the purpose set forth.

3. A continuous process of purifying pig-iron, which consists in bringing liquid pig-iron into contact with the lower part of a body of broken pieces of solid metallic ore, heating the upper part of the body of ore by means of heat generated during the reaction in and rising from the purifying zone, drawing off the liquid-purified iron from the purifying zone, drawing off the slag formed during the reactions, introducing additional liquid pig-iron to the lower part of the body of ore and adding additional metallic ore at the top of the body of ore.

4. A continuous process of purifying pig-iron, which consists in bringing liquid pig-iron into contact with the lower part of a body of broken pieces of solid metallic ore, causing a bath of the liquid pig-iron to accumulate, maintaining immersion of the lower part of the ore-body in the bath by the weight of the ore-body above, drawing off the liquid-purified iron from the lower part of the body of ore, drawing off the slag formed by the reactions, introducing additional pig-iron to the lower part of the ore-body and adding metallic ore at the top of the ore-body.

In testimony whereof I have hereunto subscribed my name.

JOHN B. NAU.

Witnesses:
KATHARINE MACMAHON,
WILLIAM A. STAHLIN.